United States Patent
Sanne et al.

[15] 3,686,399
[45] Aug. 22, 1972

[54] METHOD OF CONTROLLING FUNGI

[72] Inventors: Walter Sanne; Karl-Heinz Koenig; Ernst-Heinrich Pommer, all of Ludwigshafen am Rhine; Herbert Stummeyer, Mannheim, all of Germany

[73] Assignee: Badische Anilin- & Soda-Fabrik Aktiengesellschaft, Ludwigshafen am Rhine, Germany

[22] Filed: Jan. 5, 1970

[21] Appl. No.: 499

Related U.S. Application Data

[60] Continuation of Ser. No. 550,612, May 17, 1966, abandoned, which is a division of Ser. No. 498,083, Oct. 12, 1965, abandoned, which is a continuation-in-part of Ser. No. 227,697, Oct. 2, 1962, abandoned, which is a continuation-in-part of Ser. No. 174,719, Feb. 21, 1962, abandoned.

[52] U.S. Cl. ................................................ 424/248
[51] Int. Cl. ................................................ A01n 9/00
[58] Field of Search .................................... 424/248

[56] References Cited

UNITED STATES PATENTS 2,817,663   12/1957   Conlon et al. ............. 424/248

FOREIGN PATENTS OR APPLICATIONS 1,320,244   1/1963   France ...................... 260/247

OTHER PUBLICATIONS

Erickson et al., Journal American Chemical Society 76: 3589–3591 (1954).

*Primary Examiner*—Albert T. Meyers
*Assistant Examiner*—Frederick E. Waddell
*Attorney*—Johnston, Root, O'Keeffe, Keil, Thompson & Shurtleff

[57] ABSTRACT

Process for controlling fungi in which plants that are to be protected are treated with a fungitoxic amount of a compound having the formula

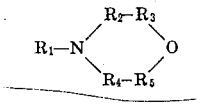

in which $R_1$ denotes a member selected from the group consisting of tridecyl and cycloalkyl with from six to 12 carbon atoms as ring members and in which $R_2$, $R_3$, $R_4$ and $R_5$ denote a member selected from the group consisting of methylene and substituted methylene with at least one of the groups $R_2$, $R_3$, $R_4$ and $R_5$ being a substituted methylene group in which the substituents are members selected from the group consisting of methyl and ethyl, the said substituents occurring once or twice in each substituted methylene group.

5 Claims, No Drawings

METHOD OF CONTROLLING FUNGI

This application is a continuation of application Ser. No. 550,612 filed May 12, 1966, now abandoned, which is a division of application Ser. No. 498,083, filed Oct. 12, 1965, now abandoned, which is a continuation-in-part of application Ser. No. 227,697, filed Oct. 2, 1962, now abandoned, which is a continuation-in-part of application Ser. No. 174,719, filed Feb. 21, 1962, now abandoned.

The present invention relates to fungicidal agents and methods of controlling fungi. More especially, the invention relates to agents and methods for controlling mildew.

We have found that compounds of the general formula:

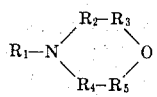

wherein $R_1$ is selected from the group consisting of tridecyl, cycloalkyl with six to 12 from atoms as ring members, cycloalkyl substituted with alkyl radicals, alkylaryl with a branched alkyl in the alkyl part of the radical, and alkylaryl with a straight-chain alkyl in the alkyl part of the radical, and wherein $R_2$, $R_3$, $R_4$ and $R_5$ denote a member selected from the group consisting of methylene and substituted methylene, at least one of the groups $R_2$, $R_3$, $R_4$ and $R_5$ being a substituted methylene group, said substituted methylene being substituted from once to twice with a member selected form the group consisting of methyl, ethyl and phenyl, and/or their salts and/or their molecular or addition compounds, have good fungicidal action. Examples of heterocyclic ring systems the derivatives of which are fungicidally active are substituted morpholines. The radical $R_1$ may be for example the tridecyl radical. Suitable anions for salts are especially the anions of inorganic acids, for example hydrochloric acid, sulfuric acid, nitric acid, hydrobromic acid and phosphoric acid. Salts of organic acids are also suitable as active substances. By molecular or addition compounds we mean stoichiometrically substantially defined associations of molecules in the liquid or solid state which are caused by van der Waals forces (also dipolar orientation, hydrogen bonding and the like) and in the formation of which primary valences are neither dissolved nor freshly formed.

The active substances according to this invention may be prepared by methods which are analogous to conventional methods. For example they may be obtained by reaction of primary or secondary amines or alkanolamines with alkylene oxides to form dialkanolamines and cyclization of these compounds with dehydrating agents. Dehydration may be carried out for example with concentrated sulfuric acid, hydrochloric acid or hydrobromic acid or dehydration catalysts, for example aluminum oxide, aluminum phosphate, or boron phosphate, in the liquid phase or in the gas phase.

Another method of preparation is hydrogenating amination of ketones with primary amino alcohols to form N-substituted secondary alkanolamines which are then reacted with alkylene oxides as above described.

The dialkanolamines are cyclized to a heterocyclic ring in the way already described with dehydrating agents.

Moreover 2,2'-dichloroalkyl ethers, which may be substituted, may be reacted with primary amines in the presence of acid-binding agents to form compounds having a heterocyclic ring.

Heterocyclic compounds containing oxygen and nitrogen and having five or six ring members, for example oxazolidines or oxazines, are readily obtainable by splitting off water from N-substituted secondary aminoethanols or aminopropanols and carbonyl compounds. For example morpholine salts are obtained from N-substituted dialkanolamines with thionyl halides.

The compounds may be prepared according to the following specification:

500 parts (by weight) of concentrated sulfuric acid is allowed to flow into 531 parts of N-di-(2-hydroxypropyl)-tridecylamine with stirring. Stirring is continued while the mixture is kept at 160° C for an hour under a water jet vacuum. The mixture is then slowly added to 2,500 parts of 25 percent caustic soda solution while stirring, allowed to settle and the upper layer (371 parts) separated off and dried over 50 parts of 50 percent caustic soda solution. The oily layer is separated off and distilled under reduced pressure. The boiling point of the product is 130° to 133° C at 0.7 mm Hg. The yield is 331 parts of 2,6-dimethyl-4-tridecylmorpholine, that is 66 percent of the theory with reference to N-di-(2-hydroxypropyl)-tridecylamine. The compound has the following constitutional formula:

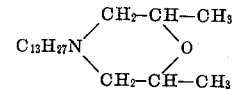

The salts may be prepared in conventional manner by mixing the initial materials, if desired in the presence of solvents. When pure initial materials are used, the salts, molecular compounds and addition compounds obtained usually do not need any further purification. Salts of organic acids (for example acetic acid, butyric acid, stearic acid, oxalic acid, adipic acid, maleic acid, lactic acid, tartaric acid, citric acid and trichloroacetic acid) are usually difficulty crystallizable viscous substances at room temperature. Salts of inorganic acids are usually amenable to crystallization. Some of them are hygroscopic.

Some of the active substances which may be used according to this invention are set out in the following Table by way of example:

N-cyclooctyl-2,6-dimethylmorpholine (b.p.$_{0.4}$ 103° C; $n^{25}_D = 1.4,855$)

N-cyclooctyl-2,6-dimethylmorpholine hydrochloride (m.p. 209° to 210° C (with decomposition))

N-cyclohexyl-2,6-dimethylmorpholine hydrochloride (m.p. 263° to 264° C)

N-cyclooctyl-2,6-tetramethylmorpholine (b.p.$_{0.5}$ 113° C; $n^{25}_D = 1.4,850$)

N-cyclooctyl-2,6-diethylmorpholine (b.p.$_{0.4}$ 124° to 125° C; $n^{25}_D = 1.4,850$)

N-cyclooctyl-2-methyl-6-ethylmorpholine (b.p.$_{0.5}$ 118° C; $n^{25}_D = 1.4,872$)

N-cyclooctyl-2-methyl-6,6-dimethylmorpholine (b.p.$_{0.5}$ 110°C; $n^{25}_D = 1.4,820$)

N-cyclooctyl-2-methylmorpholine (b.p.$_{0.5}$ 106°C; $n^{25}_D = 1.4920$)

N-cyclooctyl-2,2-dimethylmorpholine (b.p.$_{0.2}$ 93° to 94°C; $n^{25}_D = 1.4,875$)

N-(p-dodecylphenyl)-2,6-dimethylmorpholine (b.p.$_2$ 206° to 207°C)

N-cyclododecyl-2,6-dimethylmorpholine (b.p.$_{1.5}$ 161° to 162°C)

4-tridecyl-2-methyl-6-ethylmorpholine (b.p.$_{0.3}$ 136° to 137°C; $n^{25}_D = 1.4,566$)

4-tridecyl-3,3,6-trimethylmorpholine (b.p.$_{0.3}$ 121° to 123°C; $n^{25}_D = 1.4,573$)

4-tridecyl-2-methyl-5,5-dimethylmorpholine (b.p.$_{0.3}$ 125° to 129°C; $n^{25}_D = 1.4,520$)

4-tridecyl-3,3-dimethylmorpholine (b.p.$_{0.1}$ 111° to 112°C; $n^{25}_D = 1.4,607$)

2,2-dimethyl-4-cyclooctylmorpholine hydrochloride (m.p. 188° to 189°C)

2,6-diethyl-4-cyclooctylmorpholine hydrochloride (m.p. 165° to 166°C)

2-methyl-4-cyclooctylmorpholine hydrochloride (m.p. 177° to 178°C)

The fungicidally and/or fungistatically active agents according to this invention may be made up into dusting powders in the usual way by adding solid extenders or may be made up by the addition of dispersing agents, wetting agents and/or adhesives, to solid or liquid formulations for the production of sprays. It is also possible to use the substances according to this invention as emulsions or solutions which may be sprayed by the aerosol method. Admixture with other fungicides and/or insecticides is also possible. The compounds according to this invention are especially effective with true mildew fungi (for example Erysiphe), but are also effective with other injurious fungi, for example *Botrytis cinerea*.

In so far as the compounds according to this invention have systemic action, they may also be used as seed dressings.

The invention is illustrated by the following Examples but not limited thereto.

EXAMPLE 1

Leaves of barely seedlings growing in barley are sprayed with aqueous emulsions of 80 percent of active substance and 20 percent of emulsifying agent and after the sprayed coating has dried the leaves are dusted with spores of barley mildew (*Erysiphe graminis var. hordei*). The test plants are then placed in a greenhouse at temperatures between 20° and 22°C and at 75 to 80 percent relative humidity. The scale of mildew fungus development is determined after 10 days. The results observed are shown in the following table. The active substances tested are shown in the first column, namely 2,6dimethyl-4-tridecylmorpholine (A)x, N-cyclooctyl-2,6-dimethylmorpholine hydrochloride (B), 2,6-dimethyl-4tridecylmorpholine formate x (C), acetate (D), butyrate (E), acrylate (F), crotonate (G), oxalate (H), malate (I), adipate (J), maleate (K), lactate (L), tartrate (M), citrate (N), ethyl hexanate (P), 2,4-dinitro-6-(methylheptyl)-phenyl crotonate (comparative compound) (Q), untreated control (R). The remaining columns (headed "Attack") give the attack on the leaves after they have been sprayed with liquors containing the stated percentage of active substance; the extent of the attack is represented by the integers 0 to 5, 0 indicating no attack and 5 indicating total attack; the sign + indicates slight damage to the leaves.

| Active substance | Attack 0.0075% | 0.015% | 0.03% | 0.06% |
|---|---|---|---|---|
| A | 0 | 0 | 0 | |
| B | 2 | 1 | 0 | |
| C | 1 | 0 | 0 | 0+ |
| D | 0 | 0 | 0 | 0 |
| E | 0 | 0 | 0 | 0+ |
| F | 2 | 1 | 0 | 0+ |
| G | 1 | 0 | 0+ | — |
| H | 0 | 0 | 0 | 0+ |
| I | 1 | 0 | 0 | 0 |
| J | 0 | 0 | 0 | 0 |
| K | 0 | 0 | 0 | 0+ |
| L | 0 | 0 | 0+ | 0+ |
| M | 1 | 0 | 0+ | — |
| N | 1 | 0 | 0+ | — |
| P | 0 | 0 | 0+ | — |
| Q | 4 | 1 | 0 | |
| R | 5 | | 5 | |

| Active substance | Attack on leaves after spraying with liquor containing the percentage stated of active substance | | | |
|---|---|---|---|---|
| += | 0.0035 | 0.0075 | 0.015 | 0.03 |
| 4-p-/o-dodecylphenyl-2,6-dimethylmorpholine* | 3 | 2 | 1 | 0 |
| 4-cyclododecyl-2,6-dimethyl-morpholine | 1 | 0 | 0 | 0 |
| 4-tridecyl-2,6-tetramethyl-morpholine* | — | 1 | 0 | 0 |
| 4-tridecyl- 2,6-diethyl-morpholine* | 0 | 0 | 0+ | — |
| 4-tridecyl-2-methyl-6-ethyl-morpholine | 0 | 0 | 0+ | — |
| 4-tridecyl-2,5-dimethyl-morpholine | 2 | 2 | 1 | 0 |
| 4-tridecyl-3,3,6-trimethyl-morpholine | 1 | 1 | 0 | 0+ |
| 4-cyclooctyl-2,6-dimethyl-morpholine-benzoate | 1 | — | 0 | 0 |
| 4-tridecyl-3,3-dimethyl-morpholine* | 0 | 0 | 0 | 0 |
| comparative compound: 2,4-dinitro-6-(methyl-heptyl)-phenylcrotonate | 5 | 4 | 1 | 0 |
| control (untreated) | 5 | 5 | 5 | 5 | x = isomeric mixture (with reference to alkyl or alkylaryl radical)

EXAMPLE 2

Leaves strongly attacked by the true mildew (*Uncinula necator*) of grapevines planted in pots are sprayed with aqueous emulsions of 80 percent of active substance and 20 percent of emulsifying agent. The test vines are then placed in a greenhouse in diffused light in a chamber with high humidity and a temperature of 20° to 22°C. After a fortnight the coating of mildew on the leaves is evaluated according to the following scale:

0 = mildew fungus destroyed $\left.\begin{matrix}1\\2\end{matrix}\right\}$ = more or less marked destruction of the mildew fungus $\left.\begin{matrix}3\\4\end{matrix}\right\}$ = extent of further development of the fungus 5) considerable white mildew coating on the leaves (no curative action of the active substance).

The following table indicates the results, the first column giving the name of the active substance used and the remaining columns giving the attack pattern on the leaves after they have been sprayed with a liquor containing the stated percentage of active substance:

| Active substance | 0.0016% | 0.0035% | 0.0075% | 0.015% | 0.03% |
|---|---|---|---|---|---|
| 2,5-dimethyl-4-tridecylmorpholine | 1 | 0 | 0 | 0 | 0 |
| 2,4-dinitro-6-(methylheptyl)-phenyl crotonate (comparative substance) | 5 | 4 | 2 | 0 | 0 |
| control (untreated) | | 5 | | | |

EXAMPLE 3

Cyclamen plants are sprayed with aqueous emulsions of 80 percent of active substance and 20 percent of emulsifying agent and after the sprayed coating has dried out the plants are infected with a spore suspension of grey mould (*Botrytis cinerea*). The test plants are then placed in a chamber with very high humidity and temperatures between 20° and 25° C. After three weeks, the extent of the development of the grey mould is determined and evaluated according to a scale graded from 0 to 5, 0 indicating no attack and 5 indicating the extent of the attack of untreated control plants. In the following table an active substance (2,6-dimethyl-4-tridecylmorpholine) is compared with an untreated control. Attack after the plants have been sprayed with liquors containing the stated percentages of active substance is shown in the table:

| | 0.0035% | 0.0075% | 0.015% | 0.03% |
|---|---|---|---|---|
| active substance | 4 | 2 | 1–0 | 0 |
| control | | 5 | | |

What is claimed is:

1. Method of controlling fungi in plants wherein the plants to be protected from fungus attack are treated with a fungitoxic amount of a compound of the formula

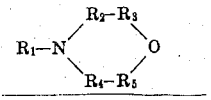

in which $R_1$ denotes a member selected from the group consisting of tridecyl and cycloalkyl with from six to 12 carbon atoms as ring members and in which $R_2$, $R_3$, $R_4$ and $R_5$ denote a member selected from the group consisting of methylene and substituted methylene with at least one of the groups $R_2$, $R_3$, $R_4$ and $R_5$ being a substituted methylene group in which the substituents are members selected from the group consisting of methyl and ethyl, the said substituents occurring once or twice in each substituted methylene group.

2. The method of claim 1 wherein the fungicidal compound is N-cyclododecyl-2,6-dimethylmorpholine.

3. The method of claim 2 wherein the fungicidal compound is an acid addition salt.

4. A method of controlling fungi in plants wherein the plants to be protected from fungus attack are treated with a fungitoxic amount of N-tridecyl-2,6-dimethylmorpholine.

5. A method as in claim 4 wherein the fungicidal compound is an acid addition salt of N-tridecyl-2,6-dimethylmorpholine.

* * * * *

PO-1050
(5/69)

UNITED STATES PATENT OFFICE
CERTIFICATE OF CORRECTION

Patent No. 3,686,399      Dated August 22, 1972

Inventor(s) Sanne et al

It is certified that error appears in the above-identified patent and that said Letters Patent are hereby corrected as shown below:

Cover page, left hand Column, insert -- [30]
Foreign Application Priority Data
Feb. 22, 1961 Germany B61 385 IV a/451
Nov. 24, 1961 Germany B64901 IV a/451
Jan. 8, 1962 Germany B65435 IV a/451

Signed and sealed this 23rd day of January 1973.

(SEAL)
Attest:

EDWARD M. FLETCHER, JR.
Attesting Officer

ROBERT GOTTSCHALK
Commissioner of Patents